F. A. HARRIS.
NUT LOCK.
APPLICATION FILED DEC. 19, 1914.
1,140,902.
Patented May 25, 1915.
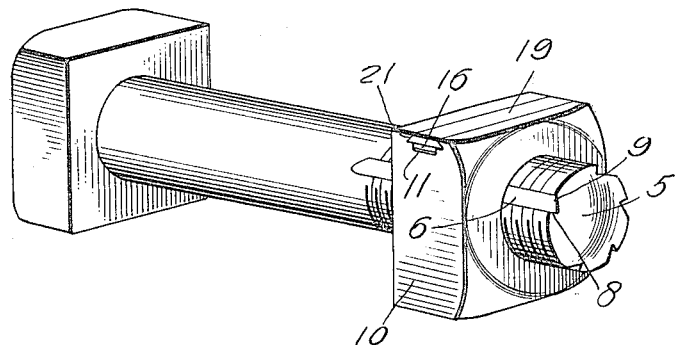
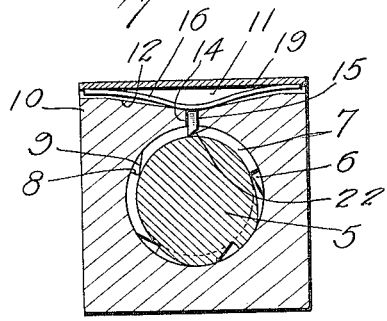
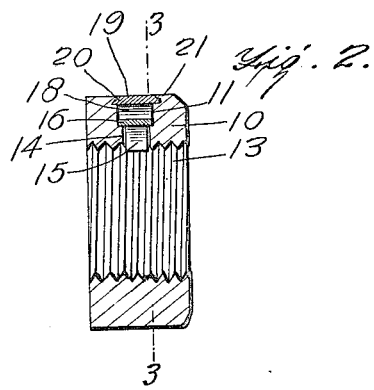
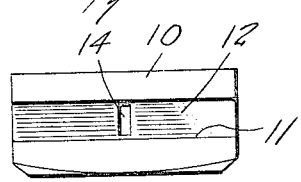
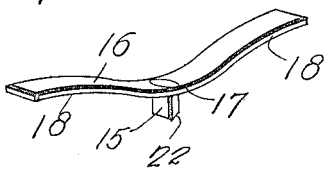
WITNESSES
INVENTOR
FRANK A. HARRIS,
BY Munn & Co.
ATTORNEYS
THE NORRIS PETERS CO., PHOTO-LITHO., WASHINGTON, D. C.

UNITED STATES PATENT OFFICE.

FRANK ALBERT HARRIS, OF SPOKANE, WASHINGTON.

NUT-LOCK.

1,140,902.  Specification of Letters Patent.  Patented May 25, 1915.

Application filed December 19, 1914. Serial No. 878,088.

*To all whom it may concern:*

Be it known that I, FRANK A. HARRIS, a citizen of the United States, residing at Spokane, in the county of Spokane and State of Washington, have invented certain new and useful Improvements in Nut-Locks, of which the following is a specification.

This invention relates to an improvement in nut locks.

One of the principal objects of the invention is to provide an improved nut lock by means of which a nut may be locked against reverse rotation on a bolt, the improvement embodying an arrangement whereby the nut may be removed from the bolt at will without mutilating either of them.

Another object of the invention is to provide an improvement of the class described, in which a spring actuated detent is carried by the nut and operates through an opening therein for engagement with the threads of the bolt at points where longitudinal grooves cut said threads, and in which means is provided for detachably maintaining the detent in its position on the bolt, said retaining means being removable whereby the detent may be removed from the nut so that the latter may be withdrawn from the bolt.

A further object of the invention is to provide a device of the class described which will be extremely simple, durable, efficient in operation and inexpensive to manufacture.

With these and other objects in view which will become apparent as the description proceeds, the invention resides in the construction, combination and arrangement of parts, hereinafter more fully described and claimed, and illustrated in the accompanying drawing, in which like characters of reference indicate like parts throughout the several figures, of which—

Figure 1 represents a perspective view of a nut and bolt equipped with my improved locking device. Fig. 2 represents a longitudinal central vertical sectional view of the nut. Fig. 3 represents a vertical transverse sectional view taken therethrough on the plane indicated by the line 3—3 of Fig. 2. Fig. 4 represents a plan view of the nut with the slide removed, and Fig. 5 represents a perspective view of the spring and detent carried thereby.

In carrying out my invention I provide a bolt 5 having a plurality of longitudinally extending channels or grooves as at 6 which cut the threads 7 of the bolt transversely of the latter. The grooves are of such a form that the threads cut thereby present a plurality of shoulders 8, opposite which, inclined surfaces 9 are formed. This arrangement to all intents and purposes fashions each thread into a plurality of ratchet teeth.

The nut indicated at 10 is provided on one side with a recess 11 whose bottom 12 inclines downwardly from near the opposite ends of the recess to the central portion of the latter. At this point the recess communicates with the threaded bore 13 of the nut through a rectangular opening 14. A detent 15 which is preferably rectangular in cross section is adapted to play within the opening 14. This detent is secured centrally on the leaf spring 16. The latter as indicated is preferably bowed slightly at its central portion 17 and from its central portion is curved upwardly and outwardly at both ends as at 18. The spring lies within the recess 11 and is of a length substantially equal to the length of the recess. In order to removably maintain the detent and spring in place, I have provided a slide 19 having beveled edges 20. The edges of the slide are adapted to work in grooves 21 provided one in each wall of recess 11 just below the adjacent surface of the nut. Grooves 21 extend longitudinally of the recess 11 and together form a dove tailed runway or groove for the reception of slide 19. When the slide is in position the ends of spring 16 bear against said slide in the manner indicated, whereby the spring acts to normally maintain the detent 15 in the position indicated in Figs. 2 and 3.

The detent is provided with a beveled lower end 22, and is so disposed in the nut that when the latter is turned upon the bolt, the beveled surface of the detent will co-act with the beveled surfaces 9 in successfully raising said detent out of the channels 6 so long as the nut is turned toward the right. When it is attempted to reverse the direction of rotation of the nut the detent will engage against the shoulders 8 of the threads, and thus absolutely prevent reverse rotation of said nut. In this manner the nut may be locked against withdrawal in any desired position on the bolt, and the only way in which the nut may be removed without mutilating the latter will be by withdrawing the slide and removing the spring and detent from the nut. The slide is formed so as to tightly fit in its guideway, in such manner as to be maintained against removal except by the use of a hammer or some other suitable heavy instrument so that there will be no danger of the slide being accidentally displaced from the nut.

By having the floor 12 of recess 11 inclined, toward the center from the ends of said recess, or depressed as it were at its central portion, room will be provided in which the spring and detent may play up and down. The recess may be filled with grease beneath the spring if so desired, so as to ease the play of the detent.

Although I have described the preferred embodiment of my invention, I may desire to make such changes in the construction, combination and arrangement of parts thereof as do not depart from the spirit of the invention as defined by the appended claims.

I claim:—

1. A nut lock comprising a bolt having mutilated threads providing a plurality of shoulders and a plurality of cam surfaces opposite the shoulders, a nut adapted to be turned upon said bolt and having a recess provided in one side thereof, said recess having a centrally depressed floor, said nut provided with an opening extending from the central portion of the recess to the bore of the nut, a leaf spring adapted to be positioned in said recess and provided with a depressed central portion adapted to normally lie in the depressed portion of the recess floor, a detent carried by said spring and adapted to extend through said opening into engagement with said mutilated threads, said detent having a beveled lower edge, and a slide provided with beveled edges adapted to be extended into a dovetailed guideway for bridging the recess, said leaf spring at its ends adapted to bear against said slide.

2. A nut lock comprising a bolt having mutilated threads, a nut adapted to be turned upon said bolt, said nut being provided with a recess in one side thereof having a floor depressed at its central portion, a leaf spring provided with a bowed central portion adapted to extend into the depression in the recess floor, a detent adapted to slidably extend through an opening in the nut into engagement with said mutilated threads, said spring adapted to press said detent into engagement with the bolt threads, and means for removably maintaining the spring in position in the recess.

3. The combination with a bolt having mutilated threads, of a nut adapted to be turned upon said bolt and provided with a recess in one side thereof having a depressed portion, said nut being further provided with an opening communicating with the depressed portion of the recess and with the bore of the nut, a detent slidably positioned in the opening, a spring adapted to be removably disposed in the recess and having a bowed portion adapted to be disposed within the depressed portion of the recess for pressing the detent into engagement with the bolt threads, and means for removably maintaining the spring in position.

4. The combination with a bolt, of a nut adapted to be turned upon said bolt and provided with a recess, a detent slidably disposed in an opening communicating with the recess and adapted to engage with the threads of the bolt, a spring adapted to be disposed in the recess for normally maintaining the detent in engagement with the bolt, and a slide adapted to be extended into the recess and to frictionally engage the nut, said slide adapted to maintain said spring and detent against accidental loss.

FRANK ALBERT HARRIS.

Witnesses:
HARRY L. COHN,
HILDA OLSON.